US008748331B2

(12) United States Patent
Talley et al.

(10) Patent No.: US 8,748,331 B2
(45) Date of Patent: Jun. 10, 2014

(54) BIOGENIC TEMPLATE FOR ENHANCED SORPTION OF CONTAMINANTS (75) Inventors: Jeffrey W. Talley, South Bend, IN (US); Steven Larson, Vicksburg, MS (US); Lawrence G. Wolfe, Saint Joseph, MI (US); Brian D. Fisher, South Bend, IN (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 1050 days.

(21) Appl. No.: 12/243,708

(22) Filed: Oct. 1, 2008

(65) Prior Publication Data
US 2009/0084731 A1    Apr. 2, 2009

Related U.S. Application Data (60) Provisional application No. 60/997,178, filed on Oct. 1, 2007.

(51) Int. Cl.
*B01J 20/30*    (2006.01)
*B01J 20/22*    (2006.01)
*B01J 37/30*    (2006.01)
B01D 15/36    (2006.01)
B09C 1/08    (2006.01)

(52) U.S. Cl.
USPC ........... 502/11; 502/401; 210/660; 405/128.5

(58) Field of Classification Search
None
See application file for complete search history.

(56) References Cited

U.S. PATENT DOCUMENTS 6,489,531 B1 * 12/2002 Carpena et al. ............... 588/2
2006/0207940 A1 * 9/2006 Kobayashi et al. ........... 210/656

OTHER PUBLICATIONS

Gross et al., Iron substituted apatites: A resorbable biomaterial with potential magnetic properties. European Cells and Materials. vol. 3, Suppl. 2 (2002) 114-117.*
Ansari, Application of polyaniline and its composites for adsorption/recovery of chromium (VI) from aqueous solutions. Acta. Chim. Slov. vol. 53 (2006) 88-94.*
Moore et al., A comparison of synthetic and animal bone derived apatite for sequestering uranium and strontium in soil and groundwater. International Containment and Remediation Technical Conference and Exhibition. Jun. 10-13, 2001, Orlando, FL, pp. 1-2.*
Bostick, Use of apatite for chemical stabilization of subsurface contaminants. Final Report to U.S. Department of Energy, National Energy Technology Laboratory. May 2003, pp. 1-195.*
Talley et al. "Treatability of As-contaminated groundwater using a waste-product fishbone." Abstract to Powerpoint presntation originally preseted Jun. 27, 2007, 11th Green Chemistry & Engineering Conference, 1 page.*

(Continued)

Primary Examiner — Katherine Zalasky
(74) Attorney, Agent, or Firm — Brain C. Jones (57) ABSTRACT A method of manufacturing a remediation material uses a biogenic material as a substrate and involves preparing the surface of the substrate to enable a chemical reaction, and performing template-driven surface derivatization on the substrate to provide a net positive charge on the substrate. The remediation material may be placed into contact with surface water, ground water, soil, or sediment by at least one of a permeable reactive barrier, direct well injection, or direct introduction of the remediation material into soil or sediment, to remove contaminants from the surface water, ground water, soil, or sediment.

8 Claims, 6 Drawing Sheets (56) References Cited

OTHER PUBLICATIONS

Talley et al., "Treatability of As-Contaminated Groundwater: Source Flux to River Sediments," Powerpoint presentation originally presented Jan. 25, 2007, The 4th International Conference on Remediation of Contaminated Sediments E6: Sediment Treatment—In-situ, 23 slides, 23 pages.

Fisher et al., "Biogenic Template: Using a waste product fishbone to treat arsenic contamination," Powerpoint presentation originally presented May 21, 2008, The 6th International Conference on Remediation of Chlorinated and Recalcitrant Compounds H7: Detection and Treatment of Arsenic, 26 slides, 13 pages.

Talley et al., "Treatability of As-contaminated groundwater using a waste-product fishbone," Powerpoint presentation originally presented Jun. 27, 2007, 11th Green Chemistry & Engineering Conference, 35 slides, 18 pages.

* cited by examiner

BIOGENIC TEMPLATE FOR ENHANCED SORPTION OF CONTAMINANTS

CROSS REFERENCE TO RELATED APPLICATION

This application is a non-provisional application claiming priority from U.S. Provisional Application Ser. No. 60/997,178 filed Oct. 1, 2007, entitled "Enhanced Apatite for the Remediation of Heavy Metal and Metalloid Pollutants," and incorporated herein by reference in its entirety.

FIELD OF THE DISCLOSURE

The present disclosure relates generally to groundwater treatment and more particularly to a biogenic template for enhanced sorption of contaminants.

BACKGROUND OF RELATED ART

Many regions of the world suffer from high concentrations of heavy metals, which pollute aquifers and water bodies. Historical and continued use of heavy metals in industrial processes continues to plague the world as an anthropogenic source of metal pollution. Anthropogenic activities such as mining, industry, and dredge material containment facilities can contribute to heavy metal pollution. Contaminated soils and waters, produced by either direct leakage or indirect leaching of wastes, will themselves leach wastes to surrounding areas. These pollutants, when ingested in a bioavailable form, are mutagenic/genotoxic. Heavy metals that accumulate in biological material poison metabolic pathways including glycolysis; oxidative phosphorylation; and protein, carbohydrate, and lipid metabolism. Active stewardship, critical for environmental health, directs the remediation of dangerously contaminated environments.

Present technologies for removal of these pollutants include both in-situ and ex-situ chemical treatment and physical sequestering. Ex-situ treatment of metal pollution involves pumping the contaminated water from storage to a treatment facility where methods such as ion exchange, chelation, and agglutination are applied. In-situ methods, such as Permeable Reactive Barriers, use materials such as zero-valent iron, phosphate and carbonate minerals, coal fly-ash, and blast furnace oxygen slag to remove pollutants. Although there typically is no need to forcefully move materials to be cleaned with in-situ methods, the contaminants must somehow contact the chemical or matrix responsible for their remediation.

The Department of Energy Hanford Site, Savannah River, and Iron Mountain, Calif. are just a few examples of contaminated sites in the United States. The leaching of high concentrations of heavy metals is a detriment to the environment and often contaminates drinking water sources. In many cases, soil and groundwater is frequently contaminated with a mix of cationic (i.e., Pb, Zn, Cu) and anionic (i.e., As, Cr) metals making remediation technically difficult.

The use of amendments, such as lime, sulfide salts, or ferric chloride injections, is a common remediation technique. Current amendments usually change contaminant speciation by altering site conditions. The changes in the environment can convert the site back to its pre-amendment state, re-releasing the contaminants. Amendments like ferric chloride injections, which work primarily by decreasing pH in an attempt to convert As (III) to As (V), can mobilize previously stable cationic metals.

In some instances, current technologies may present various challenges. For example, among other issues, the costs of treatment media may be high. Furthermore, after remediation the cleanup media themselves are hazardous wastes, and/or the sequestered material(s) may be released after time or an environmental change. Still further, treatments such as chemical oxidation may immobilize one hazardous material but release another.

DETAILED DESCRIPTION

The following description of the disclosed embodiment is not intended to limit the scope of the invention to the precise form or forms detailed herein. Instead the following description is intended to be illustrative of the principles of the invention so that others may follow its teachings.

The example methods, apparatus, systems, and articles of manufacture described herein can be used for the remediation of heavy metal contaminated lands and waters. For example, the disclosed remediation material may be used in the treatment of areas having above regulatory limits of transition metals and/or main-group metals or metalloids. Furthermore, these areas may contain hydrophobic organic compound (HOC) contaminants and extreme high or low pH values. The example material may remove such metal or metalloid elements that exist as coordinate-covalently complexed anions, or oxyanions and may also remove cationic transition or main group elements, or HOCs. The use of this example material will reduce the ambient concentrations of these contaminants by sequestering or binding them, and thus immobilize them preventing their migration to, and pollution of, cleaner areas.

One example remediation material described herein uses naturally occurring and readily available solid, porous, and surface reactive materials such as, for example apatite, as a substrate. Apatite is a group of phosphate minerals, generally referring to hydroxylapatite, fluorapatite, and chlorapatite, and named for high concentrations of OH—, F—, or Cl— ions, respectively, in the crystal. The formula of the individual minerals are written as $Ca_5(PO_4)_3(OH)$, $Ca_5(PO_4)_3F$ and $Ca_5(PO_4)_3Cl$, respectively. In its natural form, apatite is a relatively inexpensive, non-caustic, porous fishbone waste product that has a net negative surface charge. Apatite mineral's long-term stability is due to its low water solubility ($Ksp<10^{-20}$ or $10^{-40}$) and stableness in both oxidizing and reducing conditions. Additionally as apatite is a phosphate mineral, it can induce metal-phosphate phases that are nearly insoluble. These attributes make it a long-term remediation solution for cationic metals. Apatite, however, will not naturally stabilize anionic metals unless the surface is chemically altered, or enhanced, converting it to a net positive surface charge.

In the disclosed method, the substrate, for example apatite, undergoes a surface modification, preparing the material for specific environments or matrices requiring remediation. In particular, the substrate's surface negative charges are replaced either whole, or in part, by positive charge by cationic bridging. This allows a high affinity for metal anion sorption. The prepared material may then be used in a deep-bed ion exchanger for pump-and-treat processes, augured or plowed into soil, injected into wells, formed into PRB applications, or used in other available water and land remediation techniques, such as, for instance, a long-term remedial solution for As, Cr, and/or other anionic metals.

Figure 1:
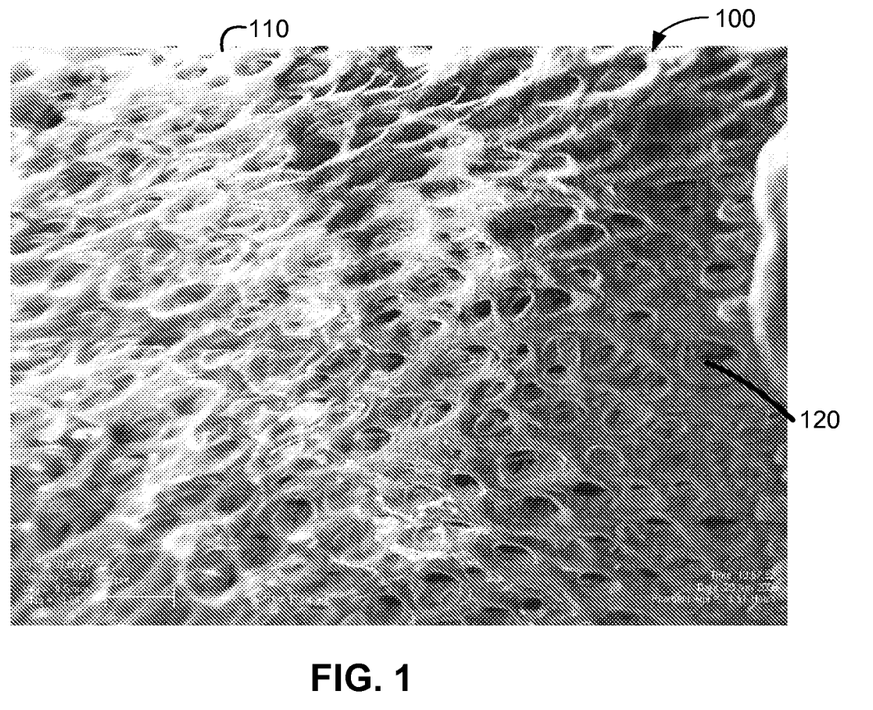
FIG. 1 is a photograph of an example substrate that may be utilized in an example biogenic template process.

Referring now to FIG. 1, an example biogenic material, such as for instance apatite 100 is illustrated. As shown, the apatite 100 acts as a substrate and is a solid material including a surface 110 having a plurality of pores 120. In this example, the apatite 100 is a porous fishbone waste product that has a net negative (−) surface charge. The illustration of the example apatite 100 of FIG. 1 was taken by a scanning electron microscope (SEM) at 1040×, and illustrates the high surface area to volume ratio of the example apatite 100. The example apatite 100 may include for example, apatite (general apatite formula: $Ca_5(PO_4)_3(OH, F, Cl)$) and/or apatite II (formula: $Ca_{10-x}Na_x(PO_4)_{6-x}(CO_3)_x(OH_2)$ for x<1). It will be appreciated, however, that the substrate may be any suitable substrate including, for example, a marine hydroxyapatite, a land animal hydroxyapatite, a marine diatom, a bone meal, a fish bone, a fish hard part, and/or any other suitable biogenic material.

Figure 2:
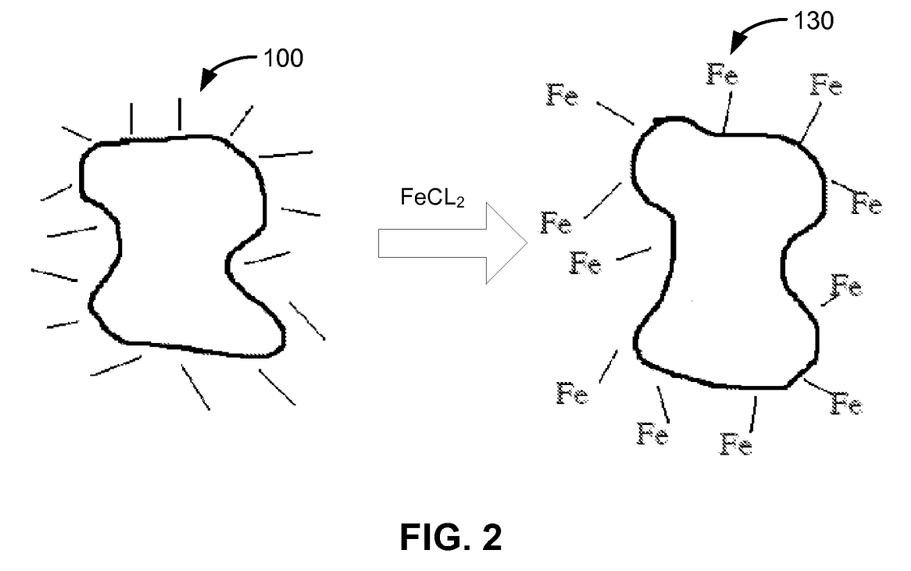
FIG. 2 is a schematic diagram of an example biogenic template process utilizing the example substrate of FIG. 1.

As schematically shown in FIG. 2, the example apatite 100 undergoes a chemical treatment to alter and/or enhance the apatite 100 to form an example remediation material 130. In the illustrated schematic, the example apatite 100 has its net negative (−) surface charge chemically altered to a net positive (+) surface charge through cationic bridging. In this example, cationic bridging utilizes Iron(II) chloride, also known as ferrous chloride having a chemical compound of formula $FeCl_2$. The example remediation material 130 may be introduced into intimate contact with ground water, and/or any other fluid environment, to attract and bind negatively charged metal ions, such as, for example, chromium (Cr), Tungsten (W), and/or arsenic (As), thereby effectively removing the negatively charged metal ions from the surrounding fluid. The example remediation material 130 may be used in-situ and/or ex-situ such as, for example, a deep-bed ion exchanger for pump-and-treat processes, augured and/or plowed into soil, injected into wells, formed into permeable reactive barrier applications, and/or used in any other available water and land remediation technique.

Figure 3:
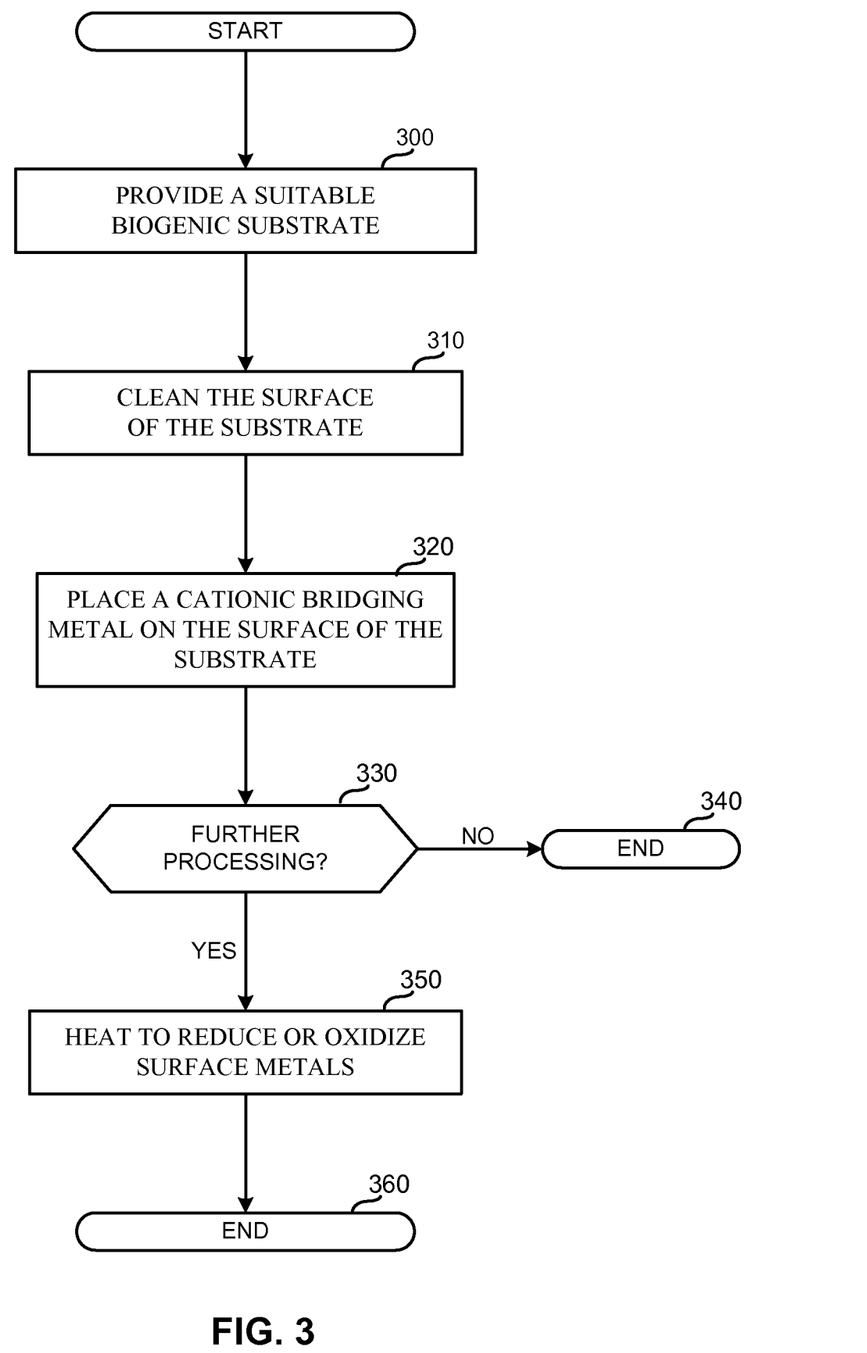
FIG. 3 is a flow diagram representative of the example biogenic template process of FIG. 2 that may be performed to prepare an example remediation product for the sorption of contaminants.

An example method of altering the surface charge of the apatite 100 to form the remediation material 130 is described in greater detail in conjunction with FIG. 3. In the disclosed method, the apatite 100 undergoes a surface modification, preparing the apatite 100 for specific environments or matrices requiring remediation. The process diagram depicted in FIG. 3 is representative of manual and/or automated steps that can be performed to implement the example remediation material 130 described herein. In particular, FIG. 3 4 depicts one example process flow that may be executed to implement the example remediation material 130 of FIG. 2. Furthermore, the example steps of FIG. 3 may be performed manually and/or automated using a processor, a controller and/or any other suitable processing device.

Turning to FIG. 3, an example substrate is selected and prepared for processing (block 300). The substrate may be any suitable biogenic material substrate, such as, for example, marine animal or land animal hydroxyapatite, or the hard, opaline shells of marine photic zone diatoms. In one example, the substrate is the apatite 100 of FIG. 2. After the particular substrate is selected, the surface of the substrate is cleaned (block 310). For instance, the surface of the substrate may be cleaned to remove any impurities, such as, for example, the organics associated with the apatite 100. While the surface of the substrate may be cleaned in any suitable technique, in one example, the surface of the substrate is washed with hydrogen peroxide and then subjected to a high temperature.

The cleaned substrate has a cationic bridging metal placed upon the surface of the substrate (block 320) to form a remediation material. In this example, a metal salt, such as, for instance, Fe(II) or Fe(III) is placed on the surface of the apatite 100 by metathesis or double metathesis to form the remediation material 130. During this step a reducing agent such a $NaBH_4$ may be used to prepare a zero valent metal directly on the substrate. Also during this step an organic monomer may be placed in an ethanolic solution of aniline to co-attach an organic polymer with the metal to form a polyaniline.

Once the remediation material is formed, the material may be used as is, or subjected to further processing (block 330). If the formed material is used as processed, the material may be utilized in any in-situ and/or ex-situ remediation process as described herein (block 340). If, however, the remediation material is subjected to further processing, the remediation material may be, for example, heated to reduce or oxidize surface metals (block 350). For instance, in one example, the formed remediation material 130 is heated to a relatively high temperature in an atmosphere of hydrogen gas, oxygen gas, and/or a carbon monoxide/carbon dioxide mixture to reduce and/or oxidize the surface metals. In this example, the remediation material 130 includes the beneficial side effect of producing a unit cell molar volume expansion. After the remediation material is subjected to further processing, the material may similarly be used in any in-situ and/or ex-situ remediation process as described herein (block 360).

In one example method of manufacturing the remediation material 130 of FIG. 2, an apatite 100 was subjected to the process of FIG. 3. Specifically, in this example, the biogenic apatite 100 varying in size from sand to a powder was provided as the selected substrate. The apatite 100 was cleaned with 30% hydrogen peroxide ($H_2O_2$), and was mechanically mixed for 3 hours to remove organics. The $H_2O_2$ was drained off and the apatite 100 was rinsed three times with de-ionized (DI) water, using a centrifuge to pour off the supernatant. The apatite 100 was then heated at 200° C. for 60 minutes to burn off remaining organics. The cleaned apatite 100 was then added to a plastic reactor that contained a solution of 0.20 M Fe, made from ferrous chloride ($FeCl_2.4H_2O$), and acidified to pH 3 using concentrated HCl.

The example reactor was tumbled for 24 hours and the formed remediation material 130 was rinsed three times with DI water, using a centrifuge to extract the supernatant. The remediation material 130 was allowed to dry in a fume hood. Solutions of 90 mg/L total As (45 mg/L as As (III) and 45 mg/L as As (V)) were then brought to pH 10 using 1 M NaOH.

The concentration of total arsenic and the pH were a worst case condition, based off data from a contaminated industrial site being utilized as a case study. Dry apatite was then measured and added to the reactors at a ratio of 1 g of apatite per 25 mL of total solution. The reactors, run in triplicate, were tumbled end over end for 120 minutes. The pH was measured and samples were collected at 30, 60, and 120 minutes.

The reactors were then left undisturbed for 6 days on a lab bench prior to starting experiment two. An initial pH reading and another sample were collected. Additional remediation material 130, doubling the total remediation material 130 mass, was added to the reactors. The reactors were then tumbled for an additional 120 minutes and samples and pH measurements were taken.

As illustrated in Table 1 below, the reactors showed a decrease in pH from pH 10 to pH 6.5 after 30 minutes. The pH continued to decrease over the next 90 minutes, but the drop in pH was significantly less and remained relatively stable over the final 60 minutes (see Table 1).

TABLE 1 monitoring of pH.

| | pH | | | | |
|---|---|---|---|---|---|
| | Time (mins) | | | Time (hours) | |
| Reactors | 0 | 30 | 60 | 120 | 145.5 | 147.5 |
| 1 | 10.03 | 6.41 | 6.29 | 6.27 | 5.77 | 5.70 |
| 2 | 10.01 | 6.36 | 6.22 | 6.04 | 5.74 | 5.71 |
| 3 | 10.02 | 6.39 | 6.25 | 6.08 | 5.79 | 5.73 |

The example remediation material 130 demonstrated the ability to decrease a highly alkaline solution to near pH 6 in just 30 minutes. The example illustrates the ability of the remediation material 130 to remove an anion, such as, for example arsenic, from a simulated groundwater solution. The kinetics of arsenic removal from solution, like the stabilization of cationic metals by apatite, was observed to be fast. In the first 30 minutes, the reactors showed an average removal of almost 25% of the total arsenic. After 120 minutes, the average removal of total arsenic from solution increased to more than 36%.

Figure 4:
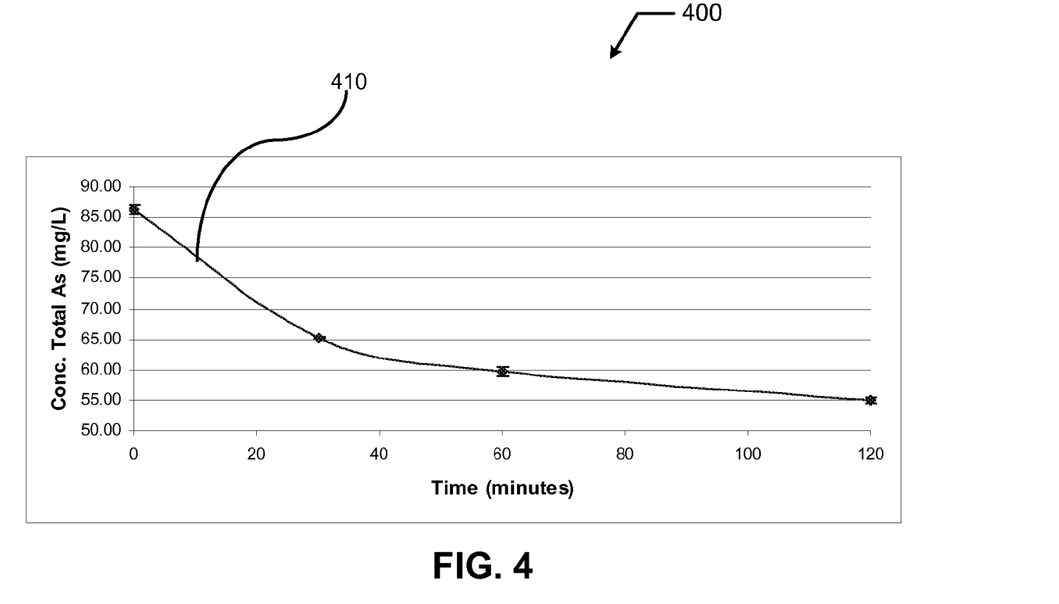
FIG. 4 is a graph illustrating an example removal of total arsenic from simulated ground water over time.

Turning to FIG. 4, there is illustrated a graph 400 showing a plot of data 410 representing the removal of the total arsenic from a simulated groundwater solution over time. As illustrated, the removal of arsenic begins to level off for all three solutions between 30 and 60 minutes. A hypothesized cause for the decline in removal rate is due to the decrease in number and availability of sorption sites. Also, as the arsenic adsorbs to the surface of the remediation material 130 it reduces the net positive surface charge of the remediation material 130.

Another sample was taken to determine the amount of arsenic removed from the simulated groundwater solution after six days during which the reactors did not tumble. The measured pH at that time had decreased to an average of 5.77 pH units. An additional amount of the example remediation material 130 (equal to the first application) was added in order to double the total mass of the remediation material 130. After 120 minutes of tumbling with the additional remediation material 130, the average pH decreased to just 5.71 pH units. Comparing this decrease to the drop from 10 to just above 6 pH units in the initial 120 minutes illustrates that the remediation material 130 will not reduce the pH to dangerously acidic conditions that are responsible for the increased mobility of cationic metals.

Figure 5:
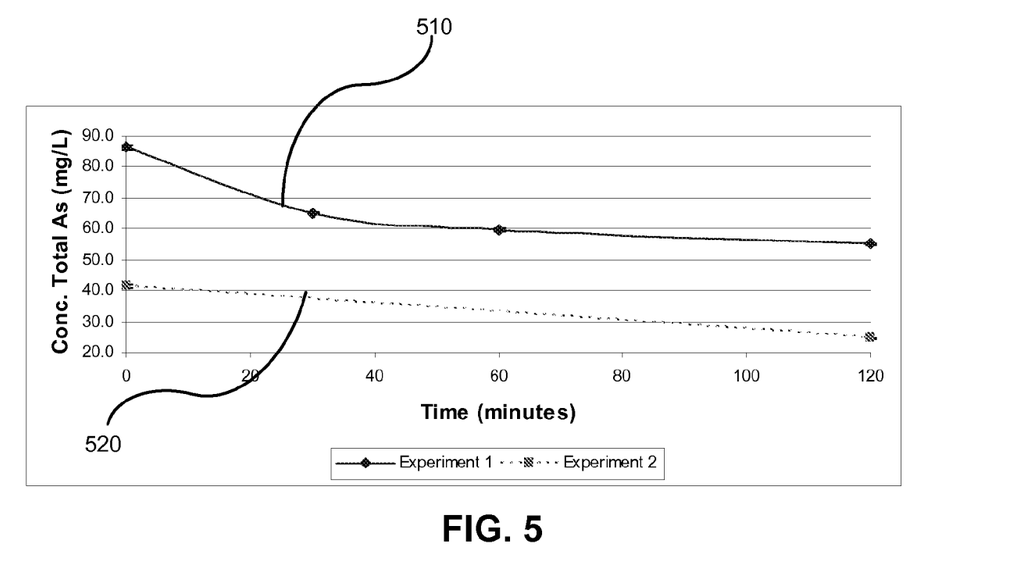
FIG. 5 is a graph similar to FIG. 4 and illustrating another example removal of total arsenic from simulated ground water over time.

A second 120 minute experiment demonstrated even greater removal efficiency than the first 120 minute period. The average removal efficiency increased from approximately 36% to nearly 41%. In particular, FIG. 5 illustrates a graph 500 showing a plot of data 510 representing a decrease in the total concentration of arsenic removal for the first experiment and a plot of data 520 representing a decrease in the total concentration of arsenic removal for the second experiment. As shown by the plot 520, the second experiment yielded greater percent removal efficiency, while the first experiment (plot 510) showed greater total arsenic removed from the simulated groundwater solution. Removal efficiencies for each experiment were calculated only for the two tumbling periods and did not include the six days between runs. Removal efficiencies were based on comparing the initial sample concentration (t=0 mins) to the final sample concentration (t=120 mins).

As shown in FIG. 5, the total arsenic concentration in solution decreased from approximately 90 mg/L to nearly 55 mg/L after just 120 minutes during the first experiment (plot 510). After 6 days, during which the reactors rested idly on a lab bench, the total arsenic concentration decreased to just over 40 mg/L. After the addition of more remediation material 130, which doubled the total mass of remediation material in the reactor, the reactors tumbled for another 120 minutes and the concentration of arsenic decreased to just below 25 mg/L. This suggests that a higher concentration of the remediation material 130 initially in solution would result in an increased removal efficiency and greater reduction of the total arsenic in solution.

In another example, an experiment was conducted with a plurality of various formed remediation materials to compare the arsenic removal capabilities from a simulated ground water by apatite and iron-modified apatite. In this example, the first remediation material was formed from a mineral form of hydroxyapatite (HA) synthesized in a laboratory with a chelate decomposition method. In particular, 0.05 M of $Ca(OH)_2$ powder was dissolved in a mixed solution of lactic acid (0.10 M) and phosphoric acid (0.03 M) under constant stirring at 4° C. for 2 hours. The resulted solution was purged with $N_2$ (high purity) for 10 minutes and then transferred to the TEFLON® liner of a reaction vessel. The reactant was then sealed and heated in an isotherm oven at 200° C. for 3 hours, after which the vessel was removed from the oven and allowed to cool in air. Upon the cooling of the vessel, the HA precipitates were collected on a filter paper and followed by washing with 500 mL of Milli-Q water. The precipitates were then dried in an oven at 90° C. for 12 hours.

A second remediation material of iron-modified HA (FeIIHA) was synthesized following a similar procedure as that for HA synthesis except that a small amount of $FeCl_2.4H_2O$ was dissolved in the mixed solution of lactic acid and phosphoric acid before the addition of $Ca(OH)_2$ powder. The molar ratio of Fe:(Ca+Fe) was 0.02, and the total metal concentration (Ca+Fe) remained 0.05 M.

A third remediation material of a biogenic form of apatite was obtained by utilizing a commercially available fish bone (Apatite II), which was provided by the PIMS NW Inc. Before loading iron on Apatite II, the raw material was treated with heat (baked fish bone, BFB) in order to remove the organics associated with Apatite II. The BFB was generated by placing 500 g of raw Apatite II (particle size 0.425-0.850 mm) into a muffle furnace and gradually increasing the temperature to 475° C. over a 24-hour period (Martin, et al., 2007). The temperature gradient with time during the generation of BFB is shown in Table 2.

TABLE 2

Temperature gradient with time during the generation of BFB

| Time (hour) | Temperature (° C.) |
|---|---|
| 0-1 | 20-200 |
| 1-3.5 | 200-250 |
| 3.5-4 | 250-300 |
| 4-4.67 | 300-350 |
| 4.67-5.17 | 350-400 |
| 5.17-5.5 | 400-425 |
| 5.5-23.3 | 425-450 |
| 23.3-48 | 450-20 |

Finally, a fourth remediation material of a preparation of iron-modified Apatite II was initialized by adding approximately 10 g of BFB in a 1-L polyethylene bottle that contained 300 mL of $FeCl_2$ solution with a concentration of 0.2 M. The suspension was shaken at 250 rpm for 24 hours and thereafter centrifuged at 1200 rpm for 5 minutes. The precipitate was collected and thoroughly cleaned with Milli-Q water for at least 3 times before being dried in a fume hood. The $FeCl_2$-treated BFB is denoted as FeIIBFB.

Once the remediation materials were obtained, batch experiments were conducted to examine the arsenic removal from the simulated ground water with the four remediation materials (HA, FeIIHA, BFB, and FeIIBFB). The experiments were carried out in 28-mL polypropylene centrifuge bottles. The reactions were started by adding 0.006 or 0.1 g of solid to 20 mL of the simulated ground water. The suspensions were mixed in the dark for 24 hours and then filtered through a 0.45-μm PTEF syringe filter. The filtrate from each sample was separated into two parts. One part of the filtrate was analyzed for total arsenic concentration with a Perkin Elmer optima 2000 DV inductively coupled plasma optical emission spectrometer (ICP-OES) without further treatment. The other part of the filtrate was passed through an LC-SAX cartridge right after the suspension was filtered by the 0.45-μm PTEF syringe filter. The LC-SAX cartridge can retain arsenate anions but allow arsenite to pass through. Thus, the arsenic redox speciation distribution in the sample can be determined by comparing the arsenic concentration in solution before and after passing through the LC-SAX cartridge. All batch experiments were conducted in duplicates.

Figure 6A:
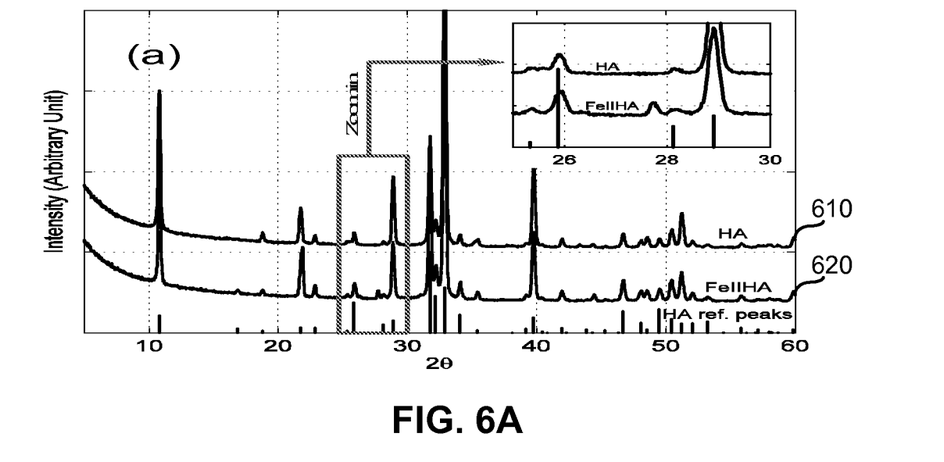
FIGS. 6A and 6B are x-ray diffraction patterns of various example remediation materials.
Figure 6B:
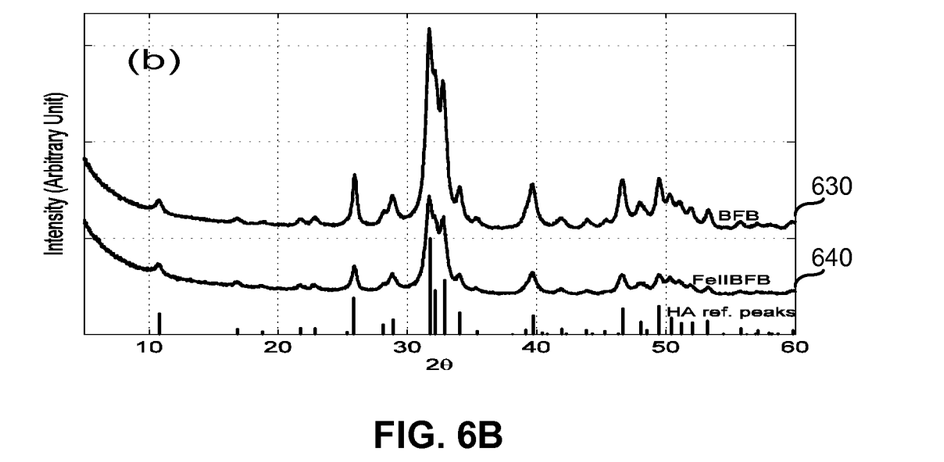

FIGS. 6A and 6B show the XRD patterns of HA (plot 610), and FeIIHA (plot 620) (FIG. 6A), and BFB (plot 630), and FeIIBFB (plot 640) (FIG. 6B), respectively. The XRD patterns of the tested materials match the ICDD standard for hydroxyapatite ($Ca_{10}(PO_4)_6(OH)_2$, ICDD number of 01-072-1243). For HA, BFB, and FeIIBFB, no phases other than hydroxapatite were detected. For FeIIHA, an additional peak reflecting a 2θ Value of 27.7 was observed (FIG. 6A), indicating that a secondary phase was formed during the synthesis of FeIIHA. This additional peak observed in the XRD pattern of the FeIIHA sample did not appear in a preliminary XRD scan with a shorter step time of 0.5 second, implying that the secondary phase was either not crystalline or contained iron because the iron fluorescence irritated by the CuKα. radiation can interfere with its X-ray diffraction. The previous experience of examining the diffraction of goethite (α-FeO(OH)) in our laboratory suggests that increasing the scan step time to 15 seconds can overcome the iron fluorescence problem. Because many compounds containing iron and phosphate can have X-ray diffraction at 2θ of 27.7, further information besides XRD is needed in order to identify the composition of the secondary phase.

The morphology of HA, FeIIHA, BFB, and FeIIBFB were examined using Field Effect Scanning Electron Microscopy (FESEM), and the surface element composition of these powders was determined by Energy Dispersive X-Ray Analysis (EDS), also referred to as EDX or EDAX. The scanning electron microscope pictures and element composition of these particles are shown in FIGS. 7A-7D.

Figure 7A:
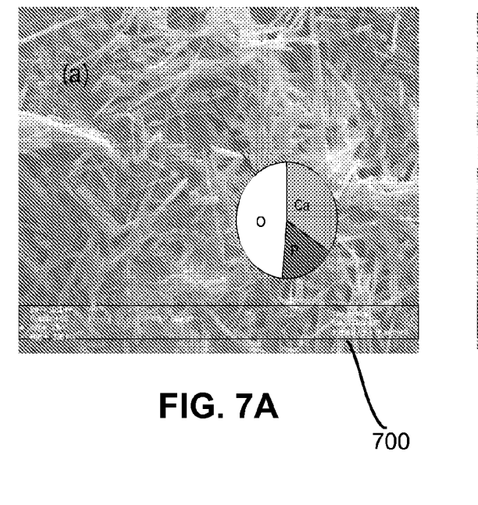
FIGS. 7A-7D are scanning electron microscope images and EDS-determined surface element compositions of various example remediation materials.
Figure 7B:
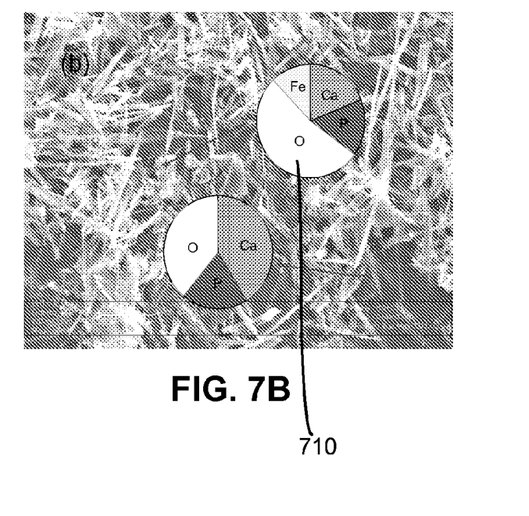

In particular, FIG. 7A illustrates the synthesized HA (700) was needle-like and has a Ca:P molar ratio of 1.55 (FIG. 7A). The scanning electron microscope image of the FeIIHA sample confirms that a secondary phase (710) other than the needle-like HA (700) existed as shown in FIG. 7B. The EDS analysis of the needle-like phase of the FeIIHA sample shows that no iron was present, implying that iron was not incorporated into the HA lattice. The EDS analysis of the secondary phase of the FeIIHA sample suggests that the secondary phase was rich in iron. The Ca:Fe:P molar ratio of the secondary phase was determined to be 2:1:2. Though many iron-phosphate associated compounds have the featured XRD peak at the 2θ. value of 27.7, only anapaite ($Ca_2Fe(PO_4)_2 \cdot (H_2O)_4$) has a Ca:Fe:P molar ratio of 2:1:2. Therefore, the secondary phase formed during the synthesis of FeIIHA is likely to be anapaite.

Figure 7C:
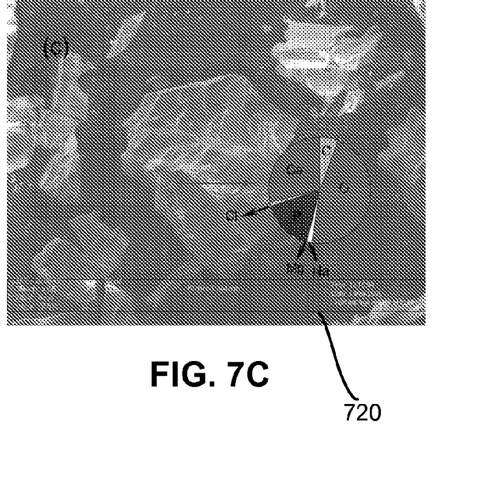
Figure 7D:
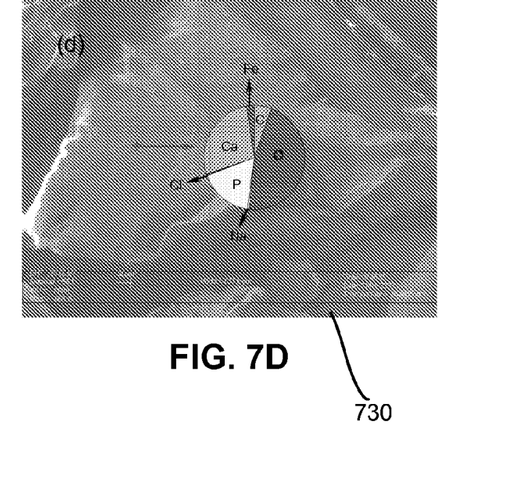

FIGS. 7C and 7D display the micrographs and element composition results for BFB (720) and FeBFB (730). The BFB appeared to be a uniform phase with small amounts of impurities of carbon, sodium, magnesium, and chloride. The modification process with $FeCl_2$ did not introduce a secondary phase, which is consistent with the XRD analysis, but did consist of 2.6% iron (by weight) to the BFB structure (FIG. 7D). The EDS analysis reveals a decrease of calcium, sodium, and magnesium proportion when iron is incorporated, which is indicative of a substitution of these elements with iron on the BFB surface.

Figure 8:
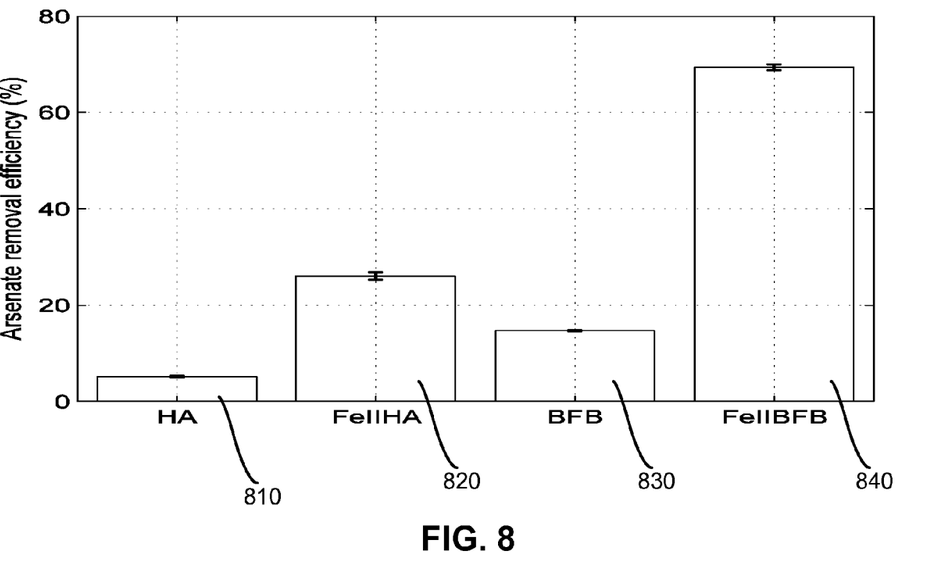
FIG. 8 is a graph representing arsenate removal efficiency from simulated ground water by various example remediation materials.

FIG. 8 shows the arsenate removal efficiencies from the simulated ground water by using HA (810), FeIIHA (820), BFB (830), and FeIIBFB (840). The initial arsenate concentration in the simulated ground water was 0.3 mg/L and the dose of the particles was 0.3 g/L. The initial pH of the simulated ground water was 8.1±0.2. There was no significant change in water pH within 24 hours after the addition of the particles.

As illustrated, by using HA and BFB, the arsenate removal efficiency from the simulated ground water was 5.2% and 14.7%, respectively. By using FeIIHA and FeIIBFB, the arsenate removal efficiency from the simulated ground water was increased to 26% and 69.4%, respectively. The experimental results suggest that the iron modification process significantly improved arsenate removal from water by apatite.

As suggested by the XRD and SEM-EDS analysis, iron was not incorporated in the lattice of the synthesized HA. Instead, a secondary phase was formed during the synthesis of FeIIHA. Therefore, the higher arsenate removal by FeIIHA than by HA suggests that the secondary phase is more efficient for arsenate elimination than HA. During the treatment of arsenate with HA, approximately 0.21 μM of phosphorus was released from HA dissolution. The phosphorus released from FeIIHA was 8 times higher than that from HA. It is possible that $PO_4^{3-}$ in the secondary phase of FeIIHA is replaced by $AsO_4^{3-}$ more easily than that in HA, resulting in the higher arsenate removal by FeIIHA than HA.

The total phosphorus released from BFB and FeIIBFB during the treatment was 2.05 and 0.85 μM, respectively. It seems that the iron incorporation decreased the solubility or the dissociation rate of the biogenic apatite. In this case, the increased arsenate-apatite surface complexation could be responsible for the increased arsenate removal by apatite via the iron modification process.

Figure 9:
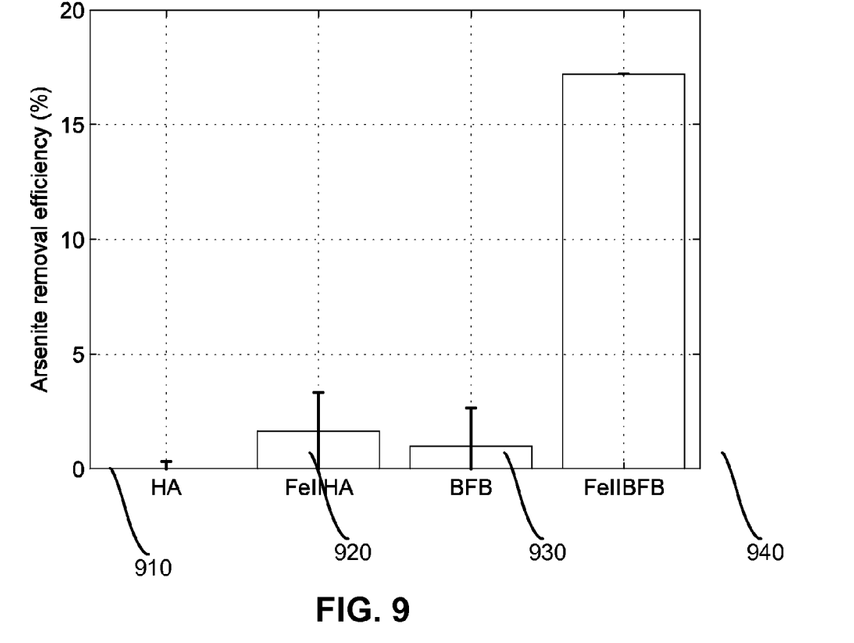
FIG. 9 is a graph representing arsenite removal efficiency from simulated ground water by various example remediation materials.

FIG. 9 shows arsenite removal efficiencies from the simulated ground water by using HA (910), FeIIHA (920), BFB (930), and FeIIBFB (940). The experimental condition was similar to that for arsenate removal tests except that the arsenic spiked to the simulated ground water was arsenite instead of arsenate. arsenic redox speciation distribution in water before and after treatment was monitored, and no arsenate was detected in any of the samples.

For waters treated with HA, FeIIHA, and BFB, the arsenic concentration was barely decreased, suggesting that these materials are not effective for arsenite elimination. For water treated with FeIIBFB, the arsenic concentration decreased from 0.3 mg/L to 0.25 mg/L, which corresponds to a removal of 16.7%. The experimental results suggest that iron modification improved the capability of apatite to remove arsenite from groundwater.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

We claim:

1. A method of manufacturing a remediation material that adsorbs contaminants, comprising;
    providing a substrate of biogenic material;
    preparing at least one surface of said substrate for a chemical reaction;
    providing an aqueous solution of metal salt:
    initiating and propagating template-driven surface derivatization on said at least one surface to establish a net positive charge on said surface by adding cationic metal ions via at least one of a single or double metathesis reaction initiated and propagated by soaking and stirring said substrate in said aqueous solution; and
    adding an ethanolic solution of aniline to said aqueous solution.

2. The method of claim 1, further comprising reducing said surface after performing said template-driven surface derivatization.

3. The method of claim 2, wherein said reducing comprises heating said surface in the presence of hydrogen gas.

4. The method of claim 1, further comprising oxidizing said surface after performing said template-driven surface derivatization.

5. The method of claim 4, wherein said oxidizing comprises heating said surface in the presence of oxygen gas.

6. The method of claim 1 in which said substrate is selected from the group consisting of marine hydroxyapatite, land animal hydroxyapatite, marine diatoms, bone meal, fish bone, animal hard parts, and any combination thereof.

7. The method of claim 1, removing organics from said substrate as a part of preparing said at least one surface.

8. The method of claim 1, in which said contaminants are selected from the group consisting of any main group metal, a metalloid present in an anion complex, a metalloid present in an oxyanion, and any combination of the above.

* * * * *